United States Patent
Hayashi

(10) Patent No.: US 7,508,424 B2
(45) Date of Patent: Mar. 24, 2009

(54) DIGITAL CAMERA CAPABLE OF COMMUNICATION WITH EXTERNAL DEVICES

(75) Inventor: Tetsuya Hayashi, Hanno (JP)

(73) Assignee: Casio Computer Co., Ltd., Tokyo (JP)

(*) Notice: Subject to any disclaimer, the term of this patent is extended or adjusted under 35 U.S.C. 154(b) by 1252 days.

(21) Appl. No.: 10/621,842

(22) Filed: Jul. 16, 2003

(65) Prior Publication Data
US 2004/0012693 A1 Jan. 22, 2004

(30) Foreign Application Priority Data
Jul. 22, 2002 (JP) ............................ 2002-212475
Jun. 6, 2003 (JP) ............................ 2003-161441

(51) Int. Cl.
*H04N 5/76* (2006.01)
(52) U.S. Cl. ............... 348/231.2; 348/207.1; 348/231.9
(58) Field of Classification Search ............ 348/207.1, 348/207.11, 231.99, 231.2, 231.7, 231.8, 348/231.9; 707/200, 202, 203, 204
See application file for complete search history.

(56) References Cited

U.S. PATENT DOCUMENTS

| | | | |
|---|---|---|---|
| 6,052,692 A | | 4/2000 | Anderson et al. |
| 6,188,431 B1 * | | 2/2001 | Oie .......................... 348/211.5 |
| 6,282,577 B1 | | 8/2001 | Okanoue et al. |
| 6,396,537 B1 * | | 5/2002 | Squilla et al. ............... 348/239 |
| 6,628,325 B1 * | | 9/2003 | Steinberg et al. ......... 348/211.1 |
| 6,630,954 B1 * | | 10/2003 | Okada ..................... 348/231.7 |
| 6,701,058 B1 * | | 3/2004 | Tsubaki ...................... 386/46 |
| 6,784,924 B2 * | | 8/2004 | Ward et al. ............... 348/207.1 |
| 7,256,820 B2 * | | 8/2007 | Tullis ....................... 348/207.1 |
| 2001/0002846 A1 * | | 6/2001 | Onishi ....................... 348/231 |
| 2002/0054224 A1 * | | 5/2002 | Wasula et al. .............. 348/232 |
| 2002/0063781 A1 | | 5/2002 | Aizawa |
| 2002/0093575 A1 * | | 7/2002 | Kusaka ..................... 348/233 |
| 2002/0149695 A1 * | | 10/2002 | Kayanuma ................. 348/375 |
| 2003/0011680 A1 * | | 1/2003 | Tanaka et al. ........... 348/207.1 |
| 2004/0201680 A1 * | | 10/2004 | Gennetten et al. ........ 348/207.1 |

FOREIGN PATENT DOCUMENTS

| | | |
|---|---|---|
| CN | 1300022 A | 6/2001 |
| EP | 0 821 535 A2 | 1/1998 |
| EP | 0 917 077 A2 | 5/1999 |
| EP | 1 107 103 A2 | 6/2001 |
| JP | 4-243236 A | 8/1992 |
| JP | 8-138074 A | 5/1996 |
| JP | 11-096731 A | 4/1999 |
| JP | 2000-092440 A | 3/2000 |
| JP | 2000-209536 A | 7/2000 |
| JP | 2002-2133406 A | 5/2002 |
| WO | WO 02/37179 A2 | 5/2002 |

* cited by examiner

*Primary Examiner*—Lin Ye
*Assistant Examiner*—Chriss S Yoder, III
(74) *Attorney, Agent, or Firm*—Frishauf, Holtz, Goodman & Chick, P.C.

(57) ABSTRACT

Digital camera is connected to personal computer via communication cable. When a user operates a key to delete any one of images recorded on memory card of the digital camera, digital camera requests personal computer to delete an image which links to the deleted image and is stored in personal computer. When receiving this command, personal computer deletes the image linked to the image deleted from digital camera. These processes ensure consistency between an original image stored in the digital camera and a copy image stored in the personal computer.

24 Claims, 8 Drawing Sheets

DIGITAL CAMERA CAPABLE OF COMMUNICATION WITH EXTERNAL DEVICES

CROSS-REFERENCE TO RELATED APPLICATIONS

This application is based upon and claims the benefit of priority from the prior Japanese Patent Application No. 2002-212475, filed Jul. 22, 2002; and No. 2003-161441, filed Jun. 6, 2003, the entire contents of both of which are incorporated herein by reference.

BACKGROUND OF THE INVENTION

1. Field of the Invention

The present invention relates to an image management system and an image management method capable of transmitting or transferring image data stored in a digital camera to an external device and recording the image data in the external device, and more particularly to a digital camera and its image processing method for implementing the image management system and image management method.

2. Description of the Related Art

A digital camera stores digital images on recording media such as various types of detachable memory cards. Recently, the storage capacity of such recording media is increasing as much as at least several tens to hundreds megabytes. Many digital cameras may connect to a personal computer via a cable or a wireless means. A user may appropriately transfer image data (as an image file) stored in the recording medium to the personal computer for managing the digital image data by the personal computer, displaying the digital image on a relatively large personal computer monitor, or printing the image.

BRIEF SUMMARY OF THE INVENTION

The present invention is directed to method and apparatus that substantially obviates one or more of the problems due to limitations and disadvantages of the related art.

According to an embodiment of the present invention, there is provided an image management system comprising a digital camera and an image recording apparatus, wherein the digital camera comprises:

an imaging unit which images an object to output first image data;

a first storage which stores the first image data output from the imaging unit;

a first processing unit which performs a predetermined process for at least one item of the first image data; and a transmitter which transmits a request for the predetermined process to the image recording apparatus, and wherein the image recording apparatus comprises:

a second storage which stores second image data including an item of data whose contents are identical to contents of an item of the first image data stored in the first storage; and a second processing unit which performs the predetermined process for an item of the second image data which is stored in the second storage and whose contents are identical to the contents of the at least one item of the first image data stored in the first storage to which the predetermined process is performed based on the request transmitted from the transmitter.

According to another embodiment of the present invention, there is provided a digital camera comprising:

an imaging unit which images an object to output first image data;

a storage which stores the first image data output from the imaging unit;

a processing unit which performs a predetermined process for at least one item of the first image data; and a transmitter which transmits a request for the predetermined process to an external device to cause the external device to perform the predetermined process for an item of second image data which is stored in the external device and whose contents are identical to contents of the at least one item of the first image data to which the predetermined process is performed by the processing unit.

According to still another embodiment of the present invention, there is provided an image management method for an image management system comprising a digital camera and an image recording apparatus, the method comprising:

performing a predetermined process for at least one item of image data stored in the digital camera;

transmitting a request for the predetermined process to the image recording apparatus; and performing the predetermined process for an item of data which is stored in the image recording apparatus and identical to the at least one item of the image data stored in the digital camera to which the predetermined process is performed based on the transmitted request.

According to still another embodiment of the present invention, there is provided an image processing method for a digital camera, the method comprising:

performing a predetermined process for at least one item of first image data stored in the digital camera; and transmitting a request to an external device, the request to cause the external device to perform the predetermined process for an item of second data which is stored in the external device and is identical to the at least one item of the first image data stored in the digital camera to which the predetermined process is performed.

BRIEF DESCRIPTION OF THE SEVERAL VIEWS OF THE DRAWINGS

The accompanying drawings, which are incorporated in and constitute a part of the specification, illustrate embodiments of the present invention and, together with the general description given above and the detailed description of the embodiments given below, serve to explain the principles of the present invention in which.

DETAILED DESCRIPTION OF THE INVENTION

Embodiments of the present invention will be described in further detail with reference to the accompanying drawings.

Figure 1:
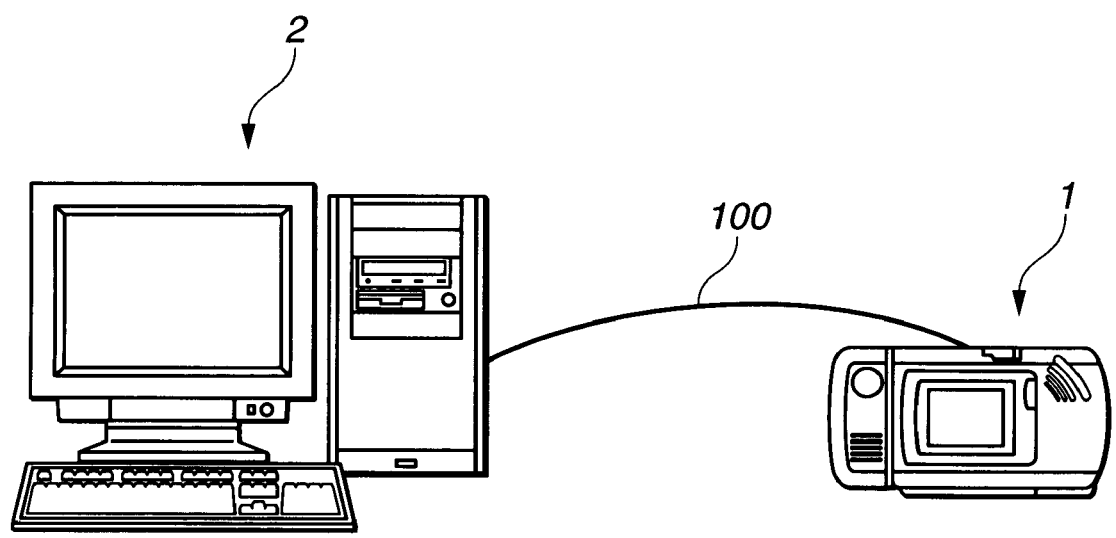
FIG. 1 is an external view of an image management system according to an embodiment of the present invention.

FIG. 1 shows a configuration of the image management system according to the embodiment. The system includes a digital camera 1 and a personal computer 2 as an electronic device. The digital camera 1 is connected to the personal computer 2 via a communication cable 100 such as a USB cable.

Figure 2:
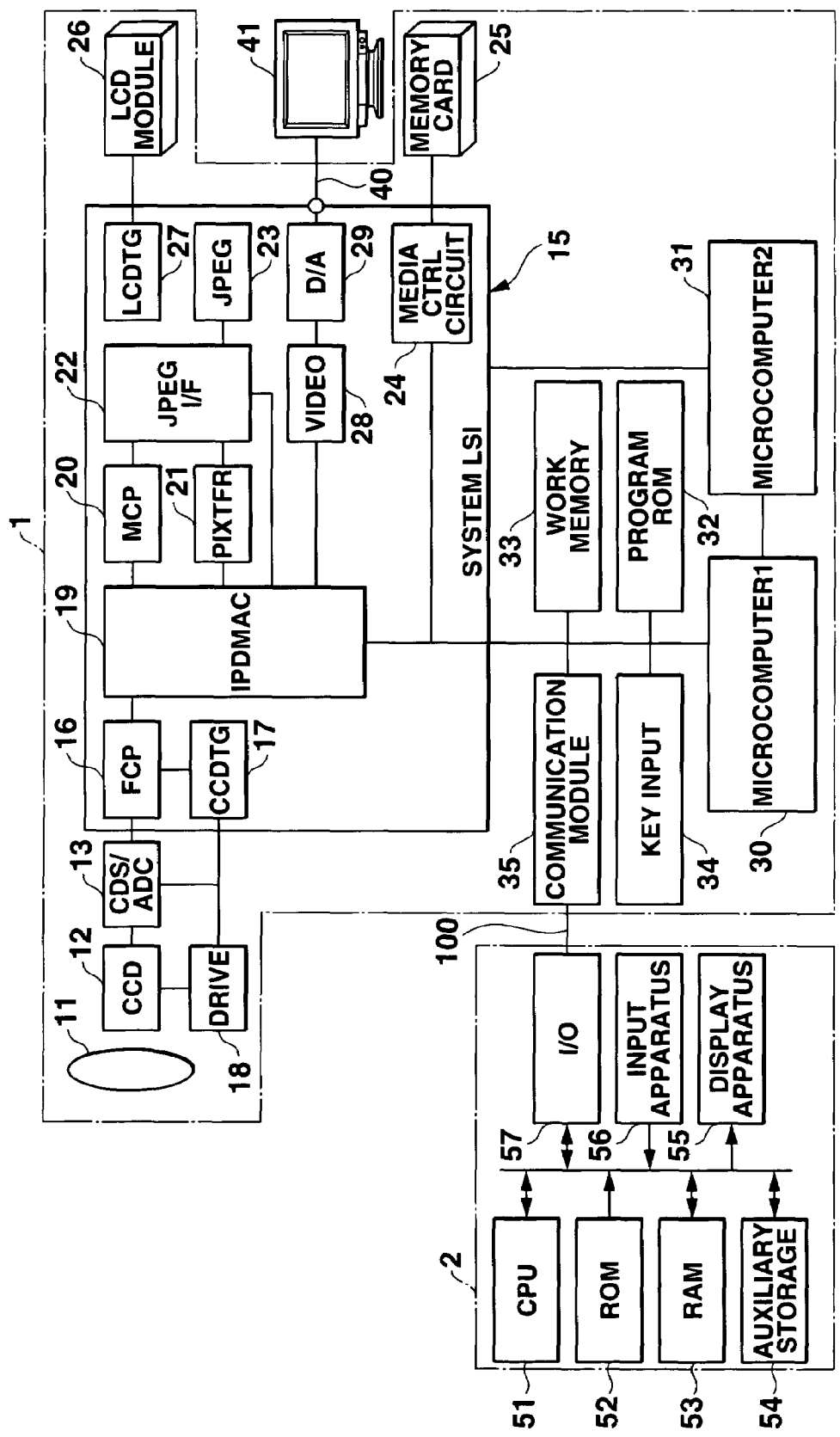
FIG. 2 is a circuit diagram of the image management system.

FIG. 2 is a block diagram showing an electrical configuration of the digital camera 1 and the personal computer 2. The respective devices are configured as described below.

Configuration of the Digital Camera

The digital camera 1 has a CCD 12 that photoelectrically converts an object's optical image formed via an optical lens system 11. When the photoelectric conversion generates the object's optical image, the CCD 12 outputs an analog image signal corresponding to the optical image to a CDS/ADC circuit 13. The CDS/ADC circuit 13 removes noise from the image signal output from the CCD 12 by using correlated double sampling. Then, the CDS/ADC circuit 13 converts the image signal into a digital signal and supplies it to an FCP circuit 16 included in a system LSI 15. The system LSI 15 includes a CCDTG circuit 17 that generates a drive timing signal for the CCD 12. A timing signal generated from the CCDTG circuit 17 is output to a drive circuit 18 that drives the CCD 12.

The system LSI 15 includes an IPDMAC circuit 19, an MCP circuit 20, a PIXTFR circuit 21, a JPEG interface (I/F) circuit 22, and a JPEG circuit 23. A digitized image signal is input to these circuits via the FCP circuit 16. The JPEG circuit 23 compresses or decompresses digital image data output from the CCD 12 based on the JPEG standard. The compressed digital data is finally stored as an image file via a media control (CTRL) circuit 24 in a memory card 25 that is detachably attached to the camera body and operates as an image storage. The system LSI 15 further includes an LCDTG circuit 27, a video circuit 28, and a D/A conversion circuit 29. The LCDTG circuit 27 drives an LCD module 26 including a liquid crystal display panel that displays an image output from the CCD 12 or an image read from the memory card 25 and decompressed. The video circuit 28 generates a video signal based on digital data of an image that is read from the memory card 25 and is decompressed. The D/A conversion circuit 29 converts an output signal from the video circuit 28 into an analog video signal and outputs this signal. The video signal output from the D/A conversion circuit 29 is supplied to an external monitor 41 connected to the camera body via a video cable 40.

The digital camera 1 includes first and second microcomputers 30 and 31, a program ROM 32 to store a program for operating these microcomputers 30 and 31, a work memory 33 including a RAM to be used by the first and second microcomputers 30 and 31, a key input block 34, and a communication module 35.

The first microcomputer 30 controls overall camera operation. The second microcomputer 31 mainly controls operations of the system LSI 15. The key input block 34 includes a power key to turn on or off the power, a shutter key for imaging operations, mode keys for setting various modes including a recording mode and a reproduction mode, and various operation keys such as +/−keys used to select setup items in various modes or to change display images. The key input block 34 outputs a corresponding operation signal to the first microcomputer 30. The communication module 35 operates as transmission means and transmits specified operation information in the digital camera 1 to the personal computer 2 under control of the first microcomputer 30. According to the embodiment, the first microcomputer 30 operates as processing means by performing operations to be described later according to the operational program stored in the program ROM 32.

Configuration of the Personal Computer

The personal computer 2 includes a CPU 51, a ROM 52, a RAM 53, an auxiliary storage 54, a display apparatus 55, an input apparatus 56, and an input/output interface 57. The ROM 52 stores a BIOS that determines basic operations of the CPU 51. The RAM 53 works as external memory for the CPU 51. The auxiliary storage 54 is specifically a hard disk that stores a variety of data such as an OS, various application programs, image files, and the like. The auxiliary storage 54 stores a specified link software (program) that allows the CPU 51 to execute operations (to be described) and to function as linking processing means. Such link software is supplied by the manufacturer of the digital camera 1 according to any method. The display apparatus 55 includes a CRT or a liquid crystal monitor. The apparatus 56 interface 57 operates as a mouse. the input/output data with the other devices under control of the CPU 51. The bidirectional data communication is made available by connecting the input/output interface 57 with the communication module 35 in the digital camera 1 via the communication cable 100.

The following describes operations of the deletion mode of the digital camera 1 having the above-mentioned configured according to the embodiment of the present invention.

Figure 3:
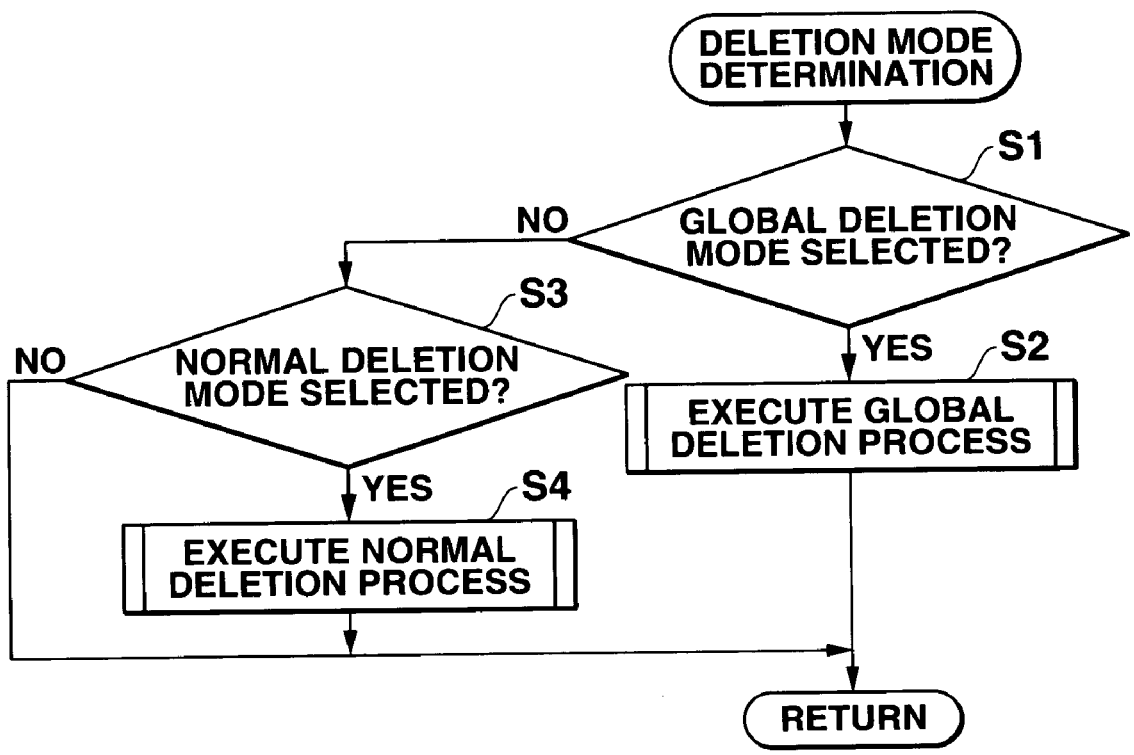
FIG. 3 is a general flowchart showing a deletion mode of a digital camera in the image management system.

FIG. 3 is a general flowchart concerning the deletion mode.

The digital camera 1 includes a normal deletion mode (first deletion mode) and a global deletion mode (second deletion mode). The normal deletion mode deletes only image files stored in the memory card 25 of the digital camera 1. The global deletion mode deletes image files stored in the memory card 25 of the digital camera 1 and in the auxiliary storage 54 of the personal computer 2.

At step S1 in FIG. 3, it is determined whether or not the global deletion mode is selected according to the user's operation of the mode key on the key input block 34. When it is determined that the global deletion mode is selected, control advances to step S2 to execute a global deletion process.

When it is determined at step S1 that the global deletion mode is not selected, control advances to step S3. It is determined at step S3 whether or not the normal deletion mode is selected according to a user's operation of the mode key on the key input block 34. When it is determined that the normal deletion mode is selected, control advances to step S4 to execute a normal deletion process.

Figure 4:
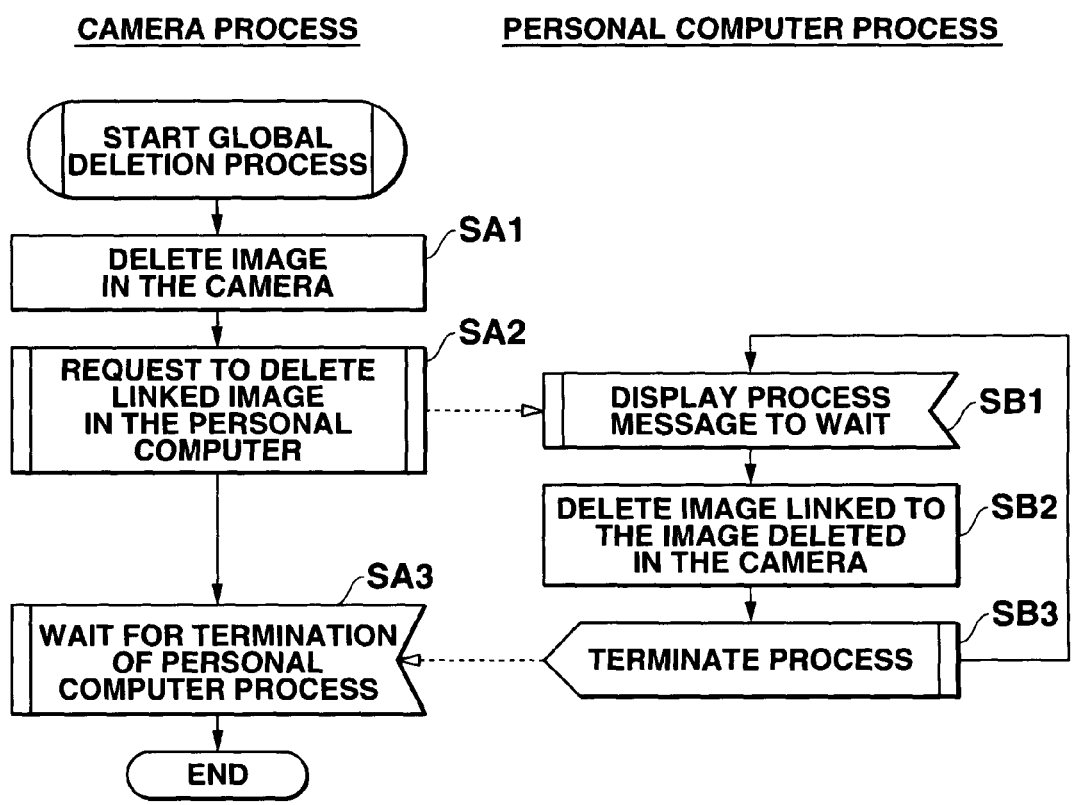
FIG. 4 is a flowchart showing an outline of a global deletion mode in the image management system.

The following outlines operations of the global deletion process at step S2 in FIG. 3 with reference to a flowchart in FIG. 4. The digital camera 1 deletes an image selected at the camera (step SA1), and then requests the personal computer 2 to delete an image that is stored in the personal computer 2 and is linked with (same as) the deleted image (step SA2). In response to this request, the personal computer 2 displays a predetermined process message (step SB1), and then deletes the image linked to the image deleted by the camera (step SB2). Upon completion of the deletion, the personal computer 2 notifies this to the digital camera 1 (step SB3). Meanwhile, the digital camera 1 waits for the process to complete (step SA3) and terminates the process when the termination notification is received from the personal computer 2.

Figure 5:
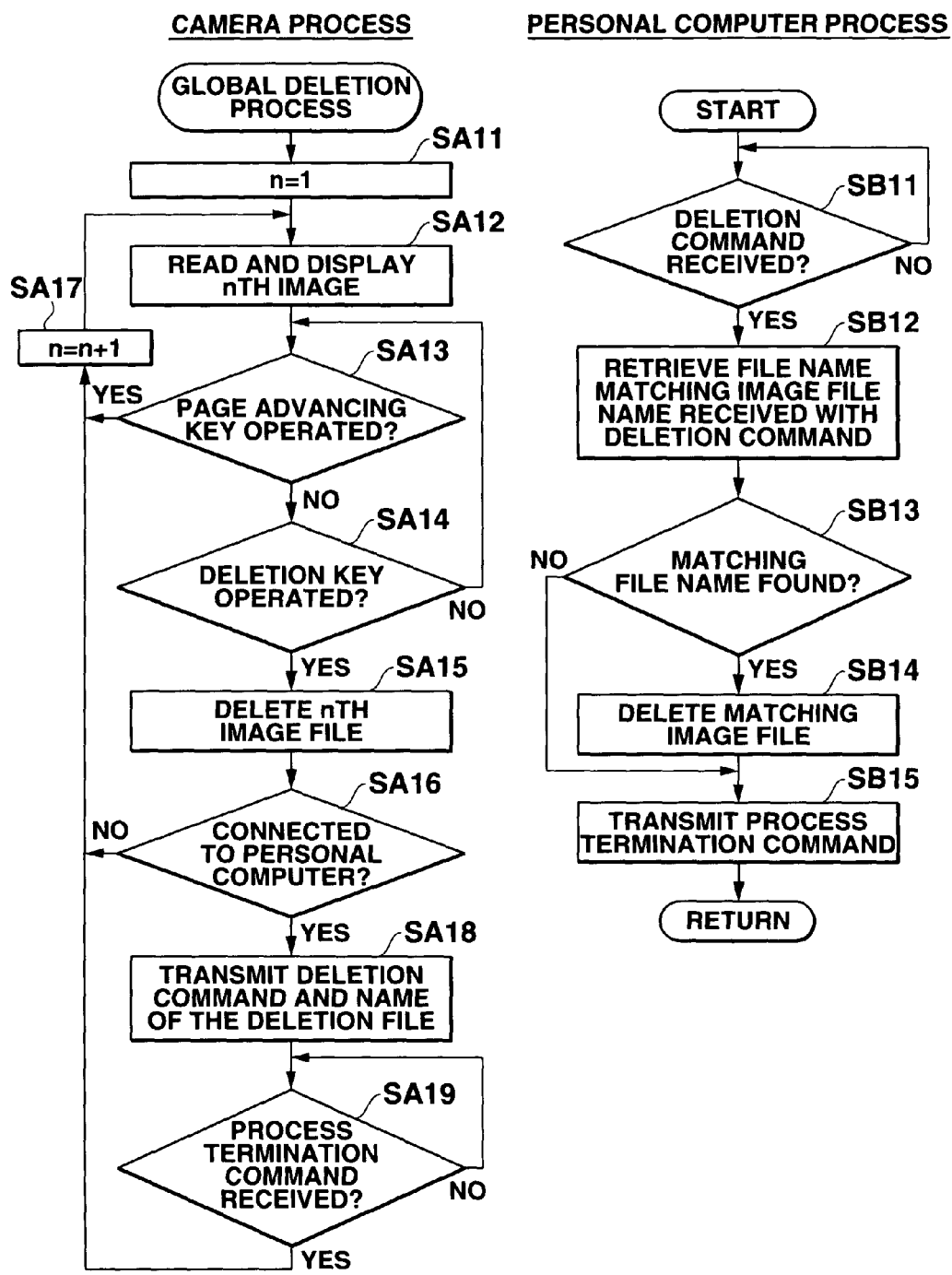
FIG. 5 is a flowchart showing details of a global deletion mode in the image management system.

Referring now to a flowchart in FIG. 5, the following describes details of the global deletion process. Before the global deletion process, a user starts the above-mentioned link software on the personal computer 2. When the user operates the mode key to select the global deletion mode, the digital camera 1 assigns "1" to number "n" for an image to be selected (step SA11). This number is a serial number (management number) assigned to each image (image file) stored in the memory card 25. The digital camera 1 reads an image file assigned with such number "n" (initially set to "1") from the memory card 25, decompresses the image data using the JPEG circuit 23, displays the image on a screen of the LCD module 25, and then waits for an operation (step SA12). If the user operates a page advancing key or a page changeover key (YES at step SA13), the digital camera 1 increments the number "n" (step SA17). Control returns to step SA12, and then the digital camera 1 displays an image assigned with the next number "n" (the nth image).

When any image is displayed, the user may operate the deletion key (NO at step SA13 and YES at step SA14). In this case, the digital camera 1 deletes a file for the nth image from the memory card 25 (step SA15). Thereafter, the digital camera 1 checks for connection with the personal computer 2 via the communication cable 100. If no connection is confirmed (NO at step SA16), the digital camera 1 increments the number "n" (step SA17) and returns to step SA12 to display the next image. When not connected to the personal computer 2, the digital camera 1 repeats steps SA12 through SA17 to sequentially delete user-selected image files from the memory card 25.

When confirming the connection with the personal computer 2 (YES at step SA16), the digital camera 1 sends a deletion command and a file name (operation information according to the present embodiment) of the image file deleted at step SA15 to the personal computer 2 via the communication cable 100 (step SA18). The digital camera 1 then awaits reception of a process termination command (step SA19).

Meanwhile, when receiving the deletion command (YES at step SB11), the personal computer 2 searches the auxiliary storage 54 for an image file matching the image file name received with the deletion command (step SB12). If there is an image file having the matching file name (YES at step SB13), the personal computer 2 deletes the image file from the auxiliary storage 54 (step SB14). The personal computer 2 sends the process termination command to the digital camera 1 via the communication cable 100 (step SB15). If there is no matching image file (NO at step SB13), the personal computer 2 immediately sends the process termination command to the digital camera 1 via the communication cable 100. Thereafter, the personal computer 2 repeats the above-mentioned process until the link software terminates.

When receiving the process termination command from the personal computer 2 (YES at step SA19), the digital camera 1 increments the number "n" (step SA17), and then returns to step SA12 to repeat the above-mentioned process.

Figure 6:
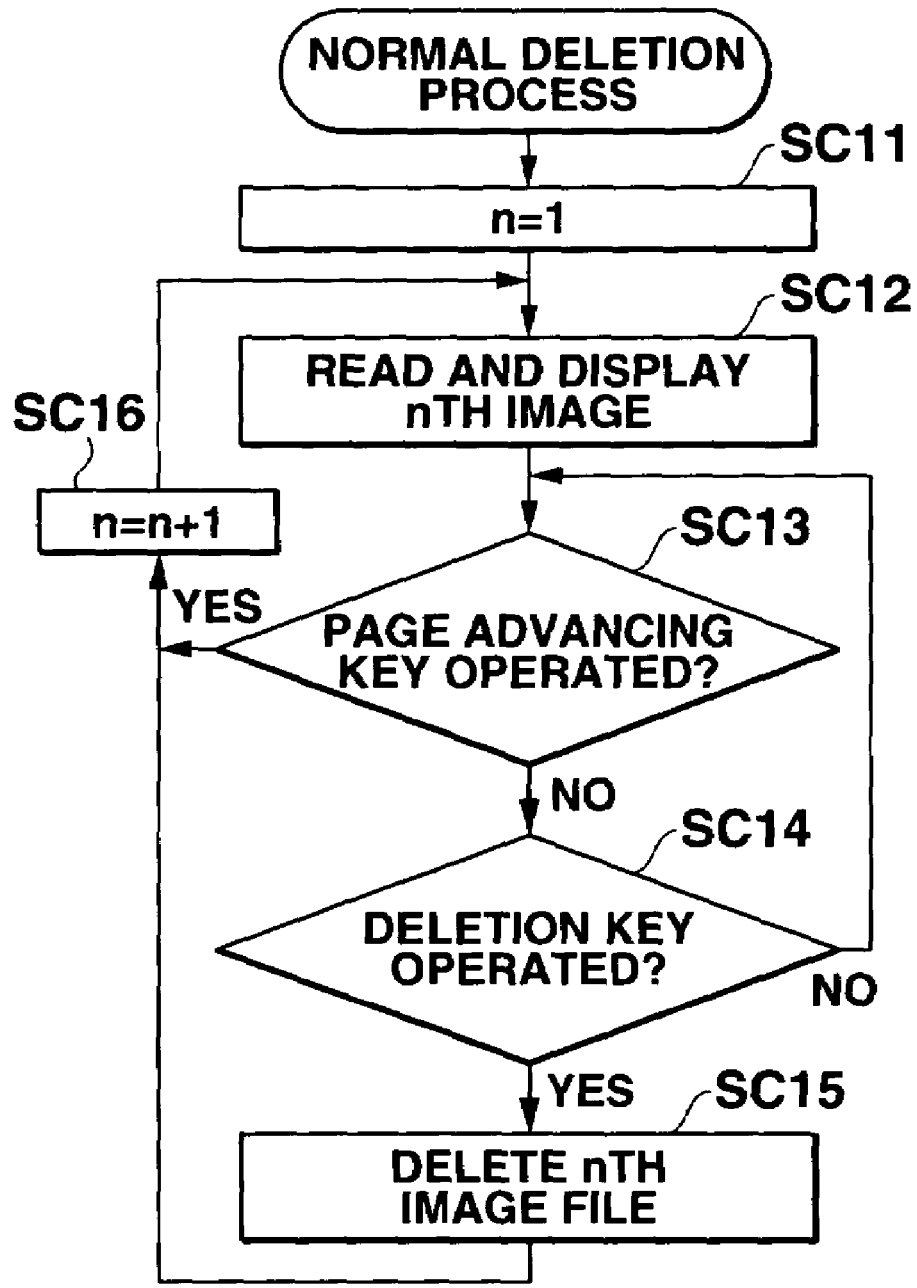
FIG. 6 is a flowchart showing details of a normal deletion mode in the digital camera.

Referring now to a flowchart in FIG. 6, the following describes details of the normal deletion process at step S4 in FIG. 3.

When the user operates the mode key to select the normal deletion mode, the digital camera 1 assigns "1" to number "n" for an image to be selected (step SC11). This number "n" is a serial number (management number) assigned to each image (image file) stored in the memory card 25. The digital camera 1 reads an image file assigned with such number "n" (initially set to "1") from the memory card 25, decompresses the image data using the JPEG circuit 23, displays the image on the screen of the LCD module 25, and then waits for an operation (step SC12). If the user operates the page advancing key or the page changeover key (YES at step SC13), the digital camera 1 increments the number "n" (step SC16), returns to step SC12, and then displays an image assigned with the next number "n" (the nth image).

When any image is displayed, the user may operate the deletion key (NO at step SC13 and YES at step SC14). Then, the digital camera 1 deletes a file for the nth image from the memory card 25 (step SC15). The digital camera 1 then increments the number "n" (step SC16) and returns to step SC12 to display the next image. Thus, the digital camera 1 repeats steps SC12 through SC16 to sequentially delete user-selected image files from the memory card 25.

While the embodiment provides two deletion modes, the global deletion mode and the normal deletion mode, it may be preferable to provide only one deletion mode.

Figure 7:
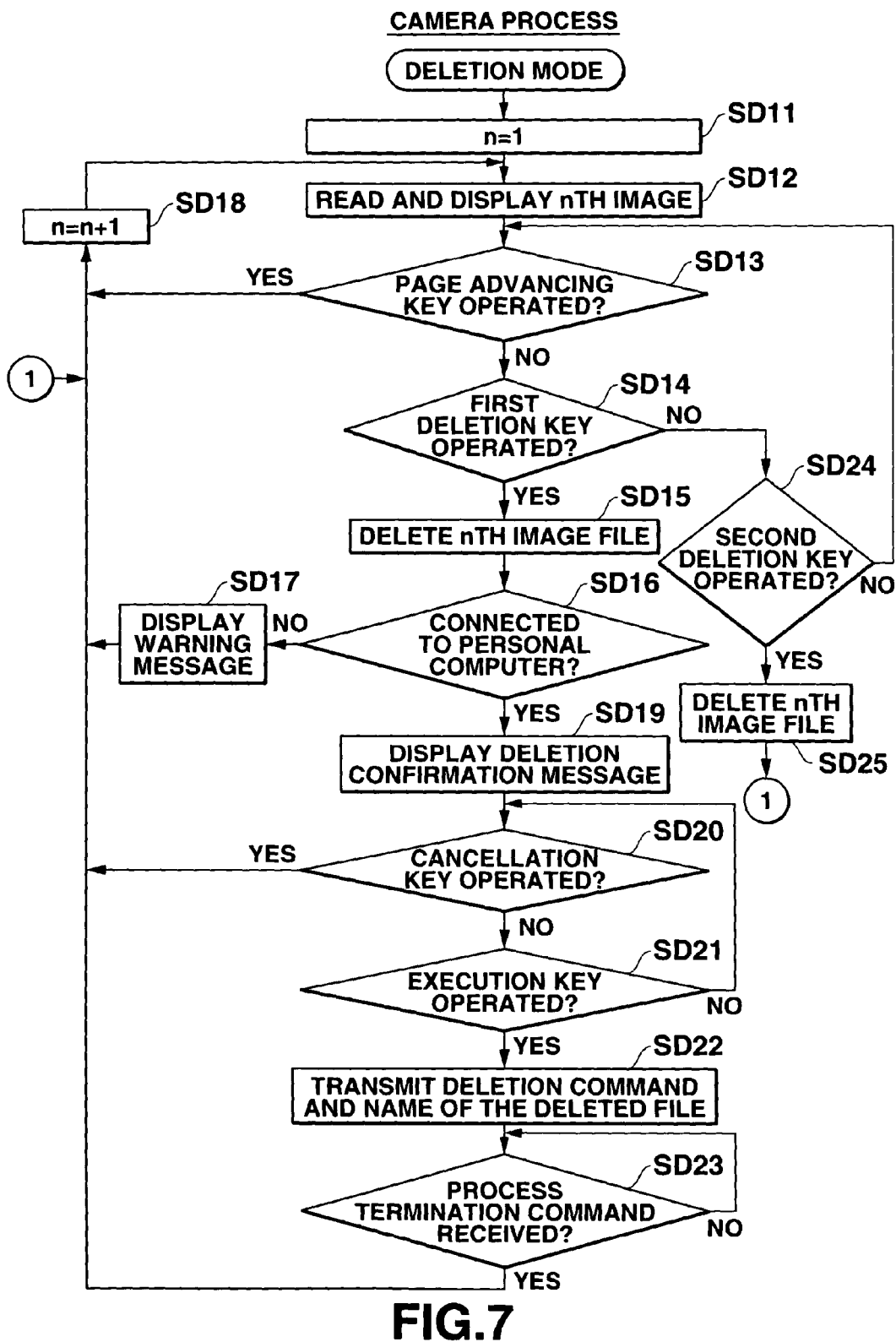
FIG. 7 is a flowchart showing details of another embodiment of the global deletion mode in the image management system.

FIG. 7 is a flowchart for explaining operations of a deletion mode capable of executing both the global deletion process and the normal deletion process described above. Because operations of the personal computer 2 is the same as those shown in FIG. 5, their description is omitted here. In this example, two deletion keys, first and second deletion keys, are provided.

When the user operates the mode key to select the deletion mode, the digital camera 1 assigns "1" to number "n" for an image to be selected (step SD11). This number "n" is a serial number (management number) assigned to each image (image file) stored in the memory card 25. The digital camera 1 reads an image file assigned with such number "n" (initially set to "1") from the memory card 25, decompresses the image data using the JPEG circuit 23, displays the image on the screen of the LCD module 25, and then waits for an operation (step SD12). If the user operates the page advancing key or the page changeover key (YES at step SD13), the digital camera 1 increments the number "n" (step SD18), returns to step SD12, and then displays an image assigned with the next number "n" (the nth image).

When any image is displayed, the user may operate the first deletion key (NO at step SD13 and YES at step SD14). In this case, the digital camera 1 deletes a file for the nth image from the memory card 25 (step SD15). Thereafter, the digital camera 1 checks for connection with the personal computer 2 via the communication cable 100. If no connection is confirmed (NO at step SD16), the digital camera 1 displays a warning message such as "Connect to personal computer" on the screen of the LCD module 26 (step SD17). The digital camera 1 then increments the number "n" (step SD18) and returns to step SD12 to display the next image.

When confirming the connection with the personal computer 2 (YES at step SD16), the digital camera 1 displays a deletion confirmation message such as "Are you sure you want to delete the image from the personal computer?" on the screen of the LCD module 26 (step SD19).

With the deletion confirmation message displayed, the digital camera 1 checks if the user operates a cancellation key (step SD20) or an execution key (step SD21).

If it is determined that the cancellation key is operated at step SD20, the digital camera 1 increments the number "n" (step SD18) and returns to step SD12 to display the next image.

If it is determined that the execution key is operated at step SD21, control advances to step SD22. The digital camera 1 sends a deletion command and a file name (operation information according to the present embodiment) of the image file deleted at step SD15 to the personal computer 2 via the communication cable 100 (step SD22). The digital camera 1 then awaits reception of the process termination command (step SD23).

When receiving the process termination command from the personal computer 2 (YES at step SD23), the digital camera 1 increments the number "n" (step SD18), and then returns to step SD12 to repeat the above-mentioned process.

If it is determined at step SD24 that the user operates the second deletion key, the digital camera 1 deletes a file corresponding to the nth image displayed at that time from the memory card 25 (step SD25). The digital camera 1 then proceeds to step SD18 to increment the number "n", and then returns to step SC12 to display the next image.

The embodiment specifies no retrieval location when the personal computer 2 retrieves an image file to be deleted from the auxiliary storage 54 during the process at step SB12. However, it is possible to provide the above-mentioned link software with a function capable of setting one or more directories (folders) as destinations for storing images copied from the memory card 25. The process at step SB12 may retrieve only image files from a predetermined storage location.

Each time the digital camera 1 deletes one image file in the system according to the embodiment, the digital camera 1 sends a deletion command and a file name of the deleted image file to the personal computer 2 and allows the personal computer 2 to retrieve and delete the corresponding image file. Alternatively, the system may be configured as follows. When the user specifies the global deletion mode, the digital camera 1 sequentially stores file names of the deleted image files. When the operation is made to terminate the global deletion mode, the digital camera 1 transmits one or more stored file names as well as the deletion command to the personal computer 2. The personal computer 2 correspondingly retrieves and deletes one or more image files at a time. When the user selects the deletion mode in FIG. 7, the digital camera 1 sequentially stores file names of the image files deleted by the operation of the first deletion key. When the operation is made to terminate the deletion mode, the digital camera 1 transmits one or more stored file names as well as the deletion command to the personal computer 2.

According to the embodiment, a user selects one image file to be deleted at a time from the digital camera 1. In addition, it may be preferable to batch-delete all image files stored in the memory card 25 (or any folder) at a time. When a batch deletion is specified in this configuration, the digital camera 1 sends file names of the batch-deleted all image files as well as the deletion command to the personal computer 2.

According to the embodiment, the personal computer 2 uses a file name to retrieve and delete the image file (duplicate image) corresponding to the image file (original file) deleted from the digital camera 1. However, the file name may be modified after the corresponding file is copied to the personal computer 2. To solve this, the digital camera 1 may send to the personal computer 2 the other specific information such as an imaging date or place, a file size, imaging conditions, and the like attached to the deleted image file. In this case, the personal computer 2 may retrieve an image file to be deleted using these pieces of specific information.

In addition, the digital camera 1 may embed a unique ID in image data stored after imaging or may record the ID as additional information about the image data on an image file. During the global deletion process, the digital camera 1 extracts the above-mentioned ID from the image file to be deleted and sends the ID and the deletion command to the personal computer 2. The personal computer 2 is allowed to retrieve and delete the image file having an ID matching the received ID.

Figure 8:
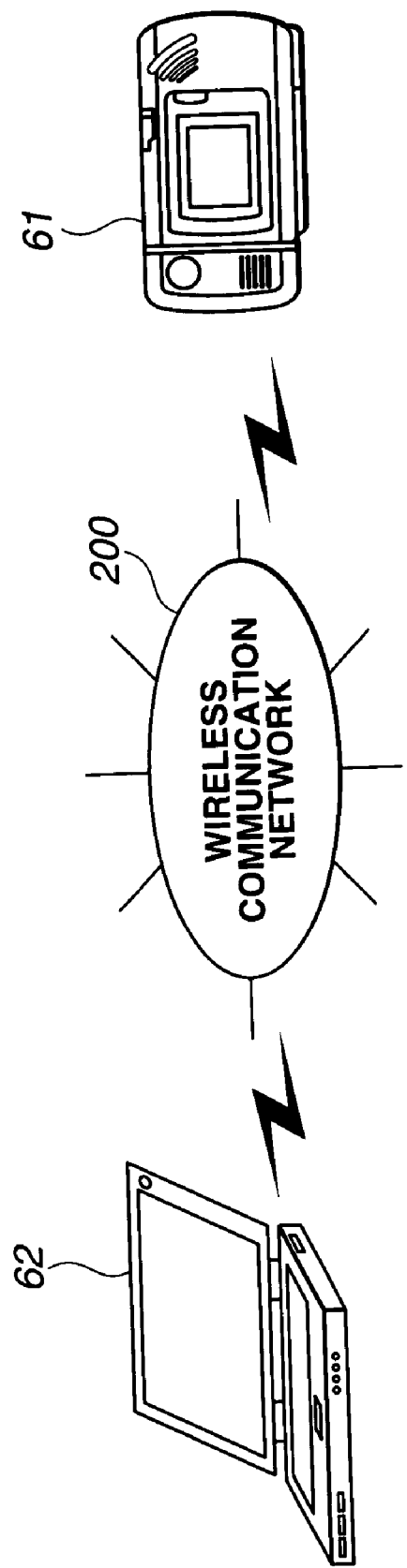
FIG. 8 is a circuit diagram of another image management system.

The embodiment has described the system configuration that connects the digital camera 1 with the personal computer 2 via the communication cable 100. In addition, both may be connected with each other by means of wireless systems such as infrared or Bluetooth (trademark) systems having a relatively short communication range. The digital camera 1 may be connected to the personal computer 2 via not only a communication network, but also various types of wireless communication networks 200 such as a wireless LAN, a cellular phone network, and the Internet as shown in FIG. 8. The image management system according to the present embodiment may include a digital camera 61 (or a cellular phone equipped with a camera) and a personal computer 62 having the basic configuration as shown in FIG. 2.

In such system, the digital camera 61 may use its memory to store transmission destination information such as a telephone number, an Internet address, and the like for specifying the personal computer 62 as a connection destination on the network. When no connection is made to the personal computer 2 for executing the global deletion process, the digital camera 61 uses the transmission destination information to execute a process for automatically making connection to the personal computer 62. The digital camera 61 then sends the deletion command and the file name of the image file deleted by the user. This allows the personal computer 62 to delete an image file corresponding to the image file deleted by the user. Further, it may be preferable to connect the digital camera 61 to a server provided on a wireless communication network 200 and delete image files stored in a database of the server.

When the digital camera 1 or 61 deletes an image file according to the above-mentioned system, the personal computer 2 or 62 also deletes the corresponding image file. Instead of or in addition to this configuration, the system may be configured as follows. When the digital camera 1 or 61 executes the other image processing or editing processes such as protecting an image file, converting colors, resizing image files, and the like, the personal computer 2 or 62 may execute the equivalent processes for the corresponding image files. Also in this case, a user may easily maintain consistency between original images stored in the digital camera 1 or 61 and copy images stored in the personal computer 2 or 62.

When the digital camera 1 or 61 executes a given process for an image file, the above-mentioned system likewise processes the corresponding image file stored in one personal computer 2 or 62. Further, there may be provided a plurality of personal computers 2 or 62. In this case, it is possible to batch process the same image file stored in the personal computers 2 or 62.

Moreover, the digital camera 1 or 61 just needs to be able to use image files stored for imaging. It may be preferable to configure the image management system according to the present embodiment using the digital camera 1 or 61 and the other electronic devices than the personal computer 2 or 62 such as a cellular phone, a mobile information terminal equipped with the communication function, and a home server. Also in this case, it is possible to easily maintain consistency between original images and copy images stored in the respective devices.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means.

What is claimed is:

1. An image management system comprising a digital camera and an image recording apparatus, wherein the digital camera comprises:
   an imaging unit which images an object to output first image data;
   a first storage which stores the first image data output from the imaging unit;
   an instructing unit which issues an instruction to perform a predetermined process for the first image data stored in the first storage;
   a first processing unit which performs the predetermined process for the first image data stored in the first storage in response to the instruction issued by the instructing unit; and
   a transmitter which transmits a request to the image recording apparatus to perform the predetermined process for image data corresponding to the first image data in response to the instruction issued by the instruction unit, and
   wherein the image recoding apparatus comprises:
      a second storage which stores second image data corresponding to the first image data before a time when the instructing unit issues the instruction; and
      a second processing unit which performs the predetermined process for the second image data that is included in total image data stored in the second storage and that corresponds to the first image data, when the request transmitted from the transmitter is received.

2. The image management system according to claim 1, wherein the second processing unit comprises:
   a retrieving unit which retrieves the second image data that is stored in the second storage, and
   a processor which performs the predetermined process for the second image data.

3. The image management system according to claim 1, wherein the image recording apparatus comprises a second transmitter which transmits information indicating completion of the predetermined process to the digital camera, and wherein the digital camera comprises a receiver which receives the information indicating the completion of the predetermined process.

4. The image management system according to claim 1, further comprising:
   a second instructing unit which issues an instruction to perform the predetermined process for the first image data stored in the first storage when the image recording apparatus is connected to the digital camera; and
   a determination unit which determines whether the predetermined process is to be performed in a first mode or a second mode based on the instruction issued by the second instructing unit, and
   wherein the transmitter: (i) transmits the request to the image recording apparatus when the second instruction unit issues the instruction and the determination unit determines that the predetermined process is to be performed in the first mode, and (ii) does not transmit the request to the image recording apparatus when the second instruction unit issues the instruction and when the determination unit determined that the predetermined process is to be performed in the second mode, even when the image recoding apparatus is connected to the digital camera.

5. A digital camera comprising:
   an imaging unit which images an object to output first image data;
   a storage which stores the first image data output from the imaging unit;
   a communication controller which communicates with an image recording apparatus that stores second image data corresponding to the first image data;
   an instructing unit which issues an instruction to perform a predetermined process for the first image data stored in the storage;
   a processing unit which performs the predetermined process for the first image data stored in the storage in response to the instruction issued by the instructing unit; and
   a transmitter which transmits, to the image recording apparatus that is communicated with the communication controller, a request to perform the predetermined process for the second image data corresponding to the first image data.

6. The digital camera according to claim 5, wherein the request comprises a command for specifying the predetermined process and an identification for specifying the first image data for which the predetermined process is performed by the processing unit.

7. The digital camera according to claim 6, wherein the identification comprises an image file name.

8. The digital camera according to claim 5, wherein the predetermined process comprises a deletion process.

9. The digital camera according to claim 5, further comprising a selector which selects the first image data stored in the storage, and wherein said processing unit performs the predetermined process for the selected first image data stored in the storage.

10. The digital camera according to claim 5, further comprising a mode setter which sets a predetermined process mode, and wherein the transmitter transmits the request when the predetermined process mode is set and the processing unit performs the predetermined process.

11. The digital camera according to claim 5, further comprising:
   a mode setup unit which sets one of a first process mode and a second process mode;
   a first unit which, when the mode setup unit sets the first process mode and the instructing unit instructs performing of the predetermined process, allows the processing unit to perform the predetermined process, and allows the transmitter to transmit the request; and
   a second unit which, when the mode setup unit sets the second process mode and the instructing unit instructs performing of the predetermined process, allows the processing unit to perform the predetermined process, and
   wherein the transmitter transmits the request to the image recording apparatus even when the image recording apparatus is connected to the digital camera without the communication controller.

12. The digital camera according to claim 5, further comprising:
   a determining unit which determines whether the digital camera is electrically connected to the image recording apparatus, wherein the transmitter transmits the request to the image recording apparatus when the determining unit determines that the digital camera is electrically connected to the image recording apparatus.

13. The digital camera according to claim 12, further comprising a notifying unit which notifies no electrical connection when the determining unit determines that the digital camera is not electrically connected to the image recording apparatus.

14. The digital camera according to claim 12, further comprising a processor which performs an electric connection process between the digital camera and the image recording apparatus when the determining unit determines that the digital camera is not electrically connected to the image recording apparatus.

15. The digital camera according to claim 5, wherein the instructing unit instructs the processing unit to perform the predetermined process and instructs the transmitter to transmit the request.

16. The digital camera according to claim 15, further comprising a canceling unit which cancels transmission of the request instructed by the instructing unit.

17. The digital camera according to claim 5, wherein the transmitter transmits the request to the image recording apparatus via a communication cable.

18. The digital camera according to claim 5, wherein the transmitter transmits the request to the image recording apparatus wirelessly.

19. The digital camera according to claim 5, wherein the transmitter transmits the request to the image recording apparatus via a communication network.

20. The digital camera according to claim 5, further comprising a second storage which stores transmission destination information for specifying the image recording apparatus, wherein the transmitter transmits the request to the image recording apparatus specified by the transmission destination stored in the second storage.

21. The digital camera according to claim 5, wherein the image recording apparatus comprises a personal computer.

22. The digital camera according to claim 5, wherein:
the instructing unit arbitrarily selects an item of the first image data for which the predetermined process is to be performed;
the processing unit performs the predetermined process for the item of the first image data selected by the instructing unit; and
the transmitter transmits a request to perform the predetermined process for an item of the item of the second image data which is stored in the image recoding apparatus and which corresponds to the item of the first image data selected by the instructing unit.

23. An image management method for an image management system comprising a digital camera and an image recording apparatus, the method comprising:
issuing an instruction to perform a predetermined process for first image data stored in the digital camera;
performing the predetermined process for the first image data stored in the digital camera in response to the issued instruction;
transmitting a request to the image recording apparatus to perform the predetermined process for image data corresponding to the first image data in response to the issued instruction; and
performing the predetermined process for second image data which is included in image data stored in the image recording apparatus, and which corresponds to the first image data, when the transmitted request is received by the image recoding apparatus,
wherein the second image data corresponding to the first image data is stored in the image recording apparatus before a time when the instruction to perform the predetermined process for the first image data is issued.

24. An image processing method for a digital camera, the method comprising:
communicating with an image recording apparatus that stores second image data corresponding to first image data stored in the digital camera;
issuing an instruction to perform a predetermined process for the first image data stored in the digital camera;
performing the predetermined process for the first image data stored in the digital camera in response to the issued instruction; and
transmitting, to the image recording apparatus with which the communication is performed, a request to perform the predetermined process for the second image data corresponding to the first image data.

* * * * *